United States Patent
Drugeon et al.

(10) Patent No.: US 11,765,392 B2
(45) Date of Patent: *Sep. 19, 2023

(54) DATA GENERATION METHOD, DATA REPRODUCTION METHOD, DATA GENERATION DEVICE AND DATA REPRODUCTION DEVICE

(71) Applicant: Panasonic Intellectual Property Management Co., Ltd., Osaka (JP)

(72) Inventors: Virginie Drugeon, Darmstadt (DE); Takahiro Nishi, Nara (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,316

(22) Filed: Apr. 26, 2022

(65) Prior Publication Data

US 2022/0256198 A1    Aug. 11, 2022

Related U.S. Application Data

(63) Continuation of application No. 17/156,912, filed on Jan. 25, 2021, now Pat. No. 11,350,133, which is a
(Continued)

(30) Foreign Application Priority Data

Nov. 9, 2015    (JP) .................................. 2015-219859

(51) Int. Cl.
*H04N 19/70*    (2014.01)
*H04N 19/85*    (2014.01)
(Continued)

(52) U.S. Cl.
CPC ............ *H04N 19/70* (2014.11); *H02M 1/084* (2013.01); *H02M 1/14* (2013.01); *H04N 7/0117* (2013.01);
(Continued)

(58) Field of Classification Search
CPC ...... H04N 19/70; H04N 7/0117; H04N 19/85; H04N 19/98; H04N 21/2343;
(Continued)

(56) References Cited

U.S. PATENT DOCUMENTS 6,397,000 B1    5/2002  Hatanaka
10,123,392 B2   11/2018 Drugeon
(Continued)

FOREIGN PATENT DOCUMENTS

JP    2014-531821 A    11/2014
WO    2014/178286 A1   11/2014

OTHER PUBLICATIONS

International Search Report issued in International Application No. PCT/JP2015/005894 dated Feb. 16, 2016.
(Continued)

*Primary Examiner* — Minh D A
(74) *Attorney, Agent, or Firm* — Wenderoth, Lind & Ponack, L.L.P.

(57) ABSTRACT

A data generation method is for generating video data that covers a second luminance dynamic range wider than a first luminance dynamic range and has reproduction compatibility with a first device that does not support reproduction of video having the second luminance dynamic range and supports reproduction of video having the first luminance dynamic range, and includes: generating a video signal to be included in the video data using a second OETF; storing, into VUI in the video data, first transfer function information for identifying a first OETF to be referred to by the first
(Continued)

device when the first device decodes the video data; and storing, into SEI in the video data, second transfer function information for identifying a second OETF to be referred to by a second device supporting reproduction of video having the second luminance dynamic range when the second device decodes the video data.

3 Claims, 10 Drawing Sheets

Related U.S. Application Data continuation of application No. 16/803,369, filed on Feb. 27, 2020, now Pat. No. 10,939,529, which is a continuation of application No. 16/401,780, filed on May 2, 2019, now Pat. No. 10,624,174, which is a continuation of application No. 16/103,411, filed on Aug. 14, 2018, now Pat. No. 10,327,306, which is a continuation of application No. 15/885,535, filed on Jan. 31, 2018, now Pat. No. 10,123,392, which is a continuation of application No. 15/611,168, filed on Jun. 1, 2017, now abandoned, which is a continuation of application No. PCT/JP2015/005894, filed on Nov. 27, 2015.

(60) Provisional application No. 62/087,035, filed on Dec. 3, 2014.

(51) Int. Cl.

| | | |
|---|---|---|
| *H04N 19/98* | (2014.01) | |
| *H05B 47/11* | (2020.01) | |
| *H05B 47/19* | (2020.01) | |
| *H05B 45/37* | (2020.01) | |
| *H05B 47/10* | (2020.01) | |
| *H02M 1/084* | (2006.01) | |
| *H02M 1/14* | (2006.01) | |
| *H04N 7/01* | (2006.01) | |
| *H04N 21/2343* | (2011.01) | |
| *H04N 21/236* | (2011.01) | |
| *H04N 21/434* | (2011.01) | |
| *H04N 21/4402* | (2011.01) | |
| *H02M 1/00* | (2006.01) | |

(52) U.S. Cl.
CPC ............ *H04N 19/85* (2014.11); *H04N 19/98* (2014.11); *H04N 21/236* (2013.01); *H04N 21/2343* (2013.01); *H04N 21/23614* (2013.01); *H04N 21/4345* (2013.01); *H04N 21/4402* (2013.01); *H05B 45/37* (2020.01); *H05B 47/10* (2020.01); *H05B 47/11* (2020.01); *H05B 47/19* (2020.01); *H02M 1/0009* (2021.05)

(58) Field of Classification Search
CPC ........... H04N 21/236; H04N 21/23614; H04N 21/4345; H04N 21/4402; H04N 5/202; H02M 1/084; H02M 1/14; H02M 1/0009; H05B 45/37; H05B 47/10; H05B 47/11; H05B 47/19; Y02B 20/40
See application file for complete search history.

(56) References Cited

U.S. PATENT DOCUMENTS

| | | |
|---|---|---|
| 10,327,306 B2 | 6/2019 | Drugeon |
| 10,426,014 B2 | 9/2019 | Drugeon |
| 10,440,800 B2 | 10/2019 | Drugeon |
| 10,560,999 B2 | 2/2020 | Drugeon |
| 10,624,174 B2 | 4/2020 | Drugeon |
| 10,939,529 B2 * | 3/2021 | Drugeon ................ H04N 19/70 |
| 11,350,133 B2 * | 5/2022 | Drugeon ................ H05B 45/37 |
| 2002/0181595 A1 | 12/2002 | Obata |
| 2010/0214422 A1 | 8/2010 | Iwamura |
| 2013/0278642 A1 | 10/2013 | Dong |
| 2014/0192885 A1 | 7/2014 | Seregin |
| 2014/0210847 A1 | 7/2014 | Knibbeler et al. |
| 2014/0253601 A1 | 9/2014 | Ma |
| 2014/0301463 A1 | 10/2014 | Rusanovskyy |
| 2014/0321534 A1 | 10/2014 | Su |
| 2016/0080714 A1 | 3/2016 | Tsukagoshi |
| 2016/0150237 A1 | 5/2016 | Kim |
| 2018/0160090 A1 | 6/2018 | Tsukagoshi |
| 2018/0199412 A1 | 7/2018 | Drugeon |
| 2019/0156471 A1 | 5/2019 | Knibbeler et al. |
| 2019/0172187 A1 | 6/2019 | Knibbeler et al. |
| 2020/0145632 A1 | 5/2020 | Tsukagoshi |

OTHER PUBLICATIONS

Series H: Audiovisual and Multimedia Systems, Infrastructure of audiovisual services—coding of moving video, "High efficiency video coding", ITU-T H.265 (Oct. 2014).

"Parameter values for the HDTV standards for production and international programme exchange", Recommendation ITU-R BT.709-5 (Apr. 2002).

Parameter values for ultra-high definition television systems for production and international programme exchange, Recommendation ITU-R BT.2020-1 (Jun. 2014).

Extended European Search Report dated Oct. 26, 2017 in corresponding European patent application No. 15 866 173.6.

Rusanovskyy D et al: "Report on CE2.1.3 test: Single-layer HDR video coding based on m36256", 113. MPEG Meeting; Oct. 19, 2015-Oct. 23, 2015; Geneva; (Motion Picture Expert Group or ISO/IEC JTC1/SC29/WG11), No. m37064, Oct. 10, 2015 (Oct. 10, 2015), XP030065432.

Cotton A et al: "BBC's response to CfE for HDR Video Coding (Category 3a)", 112. MPEG Meeting; Jun. 22, 2015-Jun. 26, 2015; Warsaw; (Motion Picture Expert Group or ISO/IEC JTC1/SC29/WG11), No. m36249, Jun. 18, 2015 (Jun. 18, 2015), XP030064617.

Le Gall (Ambarella) D et al: "High Dynamic Range with HEVC Main10", 21. JCT-VC Meeting; Jun. 19, 2015-Jun. 26, 2015; Warsaw; (Joint Collaborative Team on Video Coding of ISO/IEC JTC1/ SC29/WG11 and ITU-T SG.16); URL: http://wftp3.itu.int/av-arch/jctvc-site/, No. JCTVC-U0045, Jun. 10, 2015 (Jun. 10, 2015), XP030117462.

Office Action dated Mar. 30, 2021 in Indian patent application No. 201747019122.

Extended European Search Report dated Jul. 21, 2023 in counterpart European patent application No. 23181978.0, 8 pages.

Flynn et al., "High Efficiency Video Coding (HEVC) Range Extensions text specification: Draft 5", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTTVC-O1005, Nov. 19, 2013, XP030115459, pp. 308-309, section E.1.1, pp. 314-315, "transfer_characteristics" and table E-4, 341 pages.

* cited by examiner

FIG. 3

| | Descriptor |
|---|---|
| vui_parameters() { | |
| ... | |
| colour_description_present_flag | u(1) |
| if( colour_description_present_flag ) | |
| { | |
| colour_primaries | u(8) |
| transfer_characteristics | u(8) |
| matrix_coeffs | u(8) |
| } | |
| ... | |
| } | |

FIG. 4

| Value | Transfer Characteristic | Informative Remark |
|---|---|---|
| 0 | Reserved | For future use by ITU-T \| ISO/IEC |
| 1 | $V = \alpha * L_C^{0.45} - (\alpha - 1)$ for $1 >= L_C >= \beta$<br>$V = 4.500 * L_C$ for $\beta > L_C >= 0$ | Rec. ITU-R BT.709-5<br>Rec. ITU-R BT.1361 conventional colour gamut system (functionally the same as the values 6, 14, and 15) |
| ... | | |
| 14 | $V = \alpha * L_C^{0.45} - (\alpha - 1)$ for $1 >= L_C >= \beta$<br>$V = 4.500 * L_C$ for $\beta > L_C >= 0$ | Rec. ITU-R BT.2020<br>(functionally the same as the values 1, 6, and 15) |
| ... | | |
| 18..255 | Reserved | For future use by ITU-T \| ISO/IEC |

FIG. 5

| Value | Transfer Characteristic | Informative Remark |
|---|---|---|
| 0 | Reserved | For future use by ITU-T \| ISO/IEC |
| 1 | $V = \alpha * L_c^{0.45} - (\alpha - 1)$ for $1 >= L_c >= \beta$<br>$V = 4.500 * L_c$ for $\beta > L_c >= 0$ | Rec. ITU-R BT.709-5<br>Rec. ITU-R BT.1361 conventional colour gamut system (functionally the same as the values 6, 14, and 15) |
| ... | | |
| 14 | $V = \alpha * L_c^{0.45} - (\alpha - 1)$ for $1 >= L_c >= \beta$<br>$V = 4.500 * L_c$ for $\beta > L_c >= 0$ | Rec. ITU-R BT.2020<br>(functionally the same as the values 1, 6, and 15) |
| ... | | |
| 18 | $V = \eta * \ln(\kappa L) + \rho$ for $1 >= L > \mu \div \kappa$<br>$V = \sqrt{\kappa L}$ for $\mu \div \kappa >= L >= 0$<br>with $\kappa = 4$<br>and $\mu$, $\eta$ and $\rho$ being the solution to the equations<br>$\kappa = \mu * \exp(2 * ((1 \div \sqrt{\mu}) - 1)) = 4$<br>$\mu = \sqrt{\mu} \div 2$<br>$\rho = \sqrt{\mu} * (1 - \ln(\sqrt{\mu}))$ | BBC Hybrid Gamma OETF with $\kappa = 4$ as proposed in document ITU-R 6C/349-E from 30 October 2014 |
| 19 | $V = \eta * \ln(\kappa L) + \rho$ for $1 >= L > \mu \div \kappa$<br>$V = \sqrt{\kappa L}$ for $\mu \div \kappa >= L >= 0$<br>with $\kappa = 6$<br>and $\mu$, $\eta$ and $\rho$ being the solution to the equations<br>$\kappa = \mu * \exp(2 * ((1 \div \sqrt{\mu}) - 1)) = 6$<br>$\mu = \sqrt{\mu} \div 2$<br>$\rho = \sqrt{\mu} * (1 - \ln(\sqrt{\mu}))$ | BBC Hybrid Gamma OETF with $\kappa = 6$ as proposed in document ITU-R 6C/349-E from 30 October 2014 |
| 20 | $V = \eta * \ln(\kappa L) + \rho$ for $1 >= L > \mu \div \kappa$<br>$V = \sqrt{\kappa L}$ for $\mu \div \kappa >= L >= 0$<br>with $\kappa = 8$<br>and $\mu$, $\eta$ and $\rho$ being the solution to the equations<br>$\kappa = \mu * \exp(2 * ((1 \div \sqrt{\mu}) - 1)) = 8$<br>$\mu = \sqrt{\mu} \div 2$<br>$\rho = \sqrt{\mu} * (1 - \ln(\sqrt{\mu}))$ | BBC Hybrid Gamma OETF with $\kappa = 8$ as proposed in document ITU-R 6C/349-E from 30 October 2014 |
| 21..255 | Reserved | For future use by ITU-T \| ISO/IEC |

FIG. 6

| | Descriptor |
|---|---|
| HDR_hybrid_gamma( payloadSize ) { | |
| HDR_transfer_characteristics | u(8) |
| /* The SEI message could convey other information about the HDR content if necessary */ | |
| } | |

FIG. 7

| | Descriptor |
|---|---|
| HDR_hybrid_gamma( payloadSize ) { | |
| dynamic_range_increase | u(2) |
| maximum_average_picture_level | u(7) |
| /* The SEI message could convey other information about the HDR content if necessary */ | |
| } | |

FIG. 8

| seq_parameter_set_rbsp(){ | Descriptor |
|---|---|
| ... | |
| sps_extension_present_flag | u(1) |
| if( sps_extension_present_flag ) { | |
| sps_range_extension_flag | u(1) |
| sps_multilayer_extension_flag | u(1) |
| sps_hdr_hybrid_gamma_extension_flag | u(1) |
| sps_extension_5bits | u(5) |
| } | |
| if( sps_range_extension_flag ) | |
| sps_range_extension() | |
| if( sps_multilayer_extension_flag ) | |
| sps_multilayer_extension() /* specified in Annex F */ | |
| if( sps_hdr_hybrid_gamma_extension_flag ) | |
| sps_hdr_hybrid_gamma_extension() | |
| if( sps_extension_5bits ) | |
| while( more_rbsp_data() ) | |
| sps_extension_data_flag | u(1) |
| ... | |
| } | |

| sps_hdr_hybrid_gamma_extension(){ | Descriptor |
|---|---|
| dynamic_range_increase | u(2) |
| maximum_average_picture_level | u(7) |
| /* The SPS extension could convey other information about the HDR content if necessary */ | |
| } | |

FIG. 9

| Syntax | No. Of bits | Mnemonic |
|---|---|---|
| HDR_hybrid_gamma_descriptor() { | | |
|   descriptor_tag | 8 | uimsbf |
|   descriptor_length | 8 | uimsbf |
|   HDR_hybrid_gamma_OETF_flag | 1 | bslbf |
|   reserved | 7 | bslbf |
|   if( HDR_hybrid_gamma_OETF_flag == '1') { | | |
|     HDR_transfer_characteristics | 8 | uimsbf |
|     /* The descriptor could convey other information about the HDR content if necessary */ | | |
|   } | | |
| } | | |

FIG. 10

| Syntax | No. Of bits | Mnemonic |
|---|---|---|
| HDR_hybrid_gamma_descriptor() { | | |
|   descriptor_tag | 8 | uimsbf |
|   descriptor_length | 8 | uimsbf |
|   HDR_hybrid_gamma_OETF_flag | 1 | bslbf |
|   reserved | 7 | bslbf |
|   if( HDR_hybrid_gamma_OETF_flag == '1') { | | |
|     dynamic_range_increase | 2 | uimsbf |
|     maximum_average_picture_level | 7 | uimsbf |
|     reserved /* or any other information about the HDR content */ | 7 | bslbf |
|   } | | |
| } | | |

FIG. 11

| Syntax | No. Of bits | Mnemonic |
|---|---|---|
| HEVC_descriptor() { | | |
| ... | | |
| temporal_layer_subset_flag | 1 | bslbf |
| HEVC_still_present_flag | 1 | bslbf |
| HEVC_24hr_picture_present_flag | 1 | bslbf |
| reserved | 5 | bslbf |
| if( temporal_layer_subset_flag == '1') { | | |
| reserved | 5 | bslbf |
| temporal_id_min | 3 | uimsbf |
| reserved | 5 | bslbf |
| temporal_id_max | 3 | uimsbf |
| } | | |
| } | | |

REPLACE WITH →

| Syntax | No. Of bits | Mnemonic |
|---|---|---|
| HEVC_descriptor() { | | |
| ... | | |
| hdr_hybrid_gamma_coded_content_flag | 1 | bslbf |
| if( hdr_hybrid_gamma_coded_content_flag == '1') | | |
| dynamic_range_increase | 2 | uimsbf |
| else | | |
| reserved | 2 | bslbf |
| reserved | 2 | bslbf |
| ... | | |
| } | | |

DATA GENERATION METHOD, DATA REPRODUCTION METHOD, DATA GENERATION DEVICE AND DATA REPRODUCTION DEVICE

CROSS REFERENCE TO RELATED APPLICATIONS

This is a continuation of U.S. application Ser. No. 17/156,912, filed Jan. 25, 2021, which is a continuation of U.S. application Ser. No. 16/803,369, filed Feb. 27, 2020, now U.S. Pat. No. 10,939,529, which is a continuation of U.S. application Ser. No. 16/401,780, filed May 2, 2019, now U.S. Pat. No. 10,624,174, which is a continuation of U.S. application Ser. No. 16/103,411, filed Aug. 14, 2018, now U.S. Pat. No. 10,327,306, which is a continuation of U.S. application Ser. No. 15/885,535, filed Jan. 31, 2018, now U.S. Pat. No. 10,123,392, which is a continuation of U.S. application Ser. No. 15/611,168, filed on Jun. 1, 2017, now abandoned, which is a continuation application of PCT International Patent Application Number PCT/JP2015/005894 filed on Nov. 27, 2015, claiming the benefit of priority of U.S. Provisional Patent Application No. 62/087,035 filed on Dec. 3, 2014 and Japanese Patent Application Number 2015-219859 filed on Nov. 9, 2015, the entire contents of which are hereby incorporated by reference.

BACKGROUND

1. Technical Field

The present disclosure relates to data generation methods, data reproduction methods, data generation devices, and data reproduction devices.

2. Description of the Related Art

As a technique for generating, encoding, and multiplexing video, there are the techniques disclosed in non-patent literature (NPL) 1: ITU-T H.265 "High efficiency video coding", October, 2014, NPL 2: Recommendation ITU-R BT.709-5 (04/2002) "Parameter values for the HDTV standards for production and international programme exchange", and NPL 3: Recommendation ITU-R BT.2020-1 (06/2014) "Parameter values for ultra-high definition television systems for production and international programme exchange".

SUMMARY

For such video data generation, new methods have always been devised, and there is a demand for backward compatibility with existing devices.

Thus, an object of the present disclosure is to provide a data generation method, a data reproduction method, a data generation device, or a data reproduction device with backward compatibility.

In order to achieve the aforementioned object, the data generation method according to one aspect of the present disclosure is a data generation method for generating video data that covers a second luminance dynamic range wider than a first luminance dynamic range and has reproduction compatibility with a first device that does not support reproduction of video having the second luminance dynamic range and supports reproduction of video having the first luminance dynamic range, and the data generation method includes: generating a video signal to be included in the video data using a second opto-electrical transfer function (OETF) to be referred to by a second device when the second device decodes the video data, the second device supporting reproduction of video having the second luminance dynamic range; storing, into video usability information (VUI) in the video data, first transfer function information for identifying a first OETF to be referred to by the first device when the first device decodes the video data; and storing, into supplemental enhancement information (SEI) in the video data, second transfer function information for identifying the second OETF.

Furthermore, the data reproduction method according to one aspect of the present disclosure is a data reproduction method for reproducing video data that covers a second luminance dynamic range wider than a first luminance dynamic range and has reproduction compatibility with a first device that does not support reproduction of video having the second luminance dynamic range and supports reproduction of video having the first luminance dynamic range, the video data including: video usability information (VUI) storing first transfer function information for identifying a first opto-electrical transfer function (OETF) to be referred to by the first device when the first device decodes the video data; and supplemental enhancement information (SEI) storing second transfer function information for identifying a second OETF to be referred to by a second device when the second device decodes the video data, the second device supporting reproduction of video having the second luminance dynamic range, and the data reproduction method includes: obtaining the second transfer function information included in the SEI; and reproducing a video signal included in the video data by referring to the second OETF identified in the second transfer function information obtained.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

The present disclosure can provide a data generation method, a data reproduction method, a data generation device, or a data reproduction device with backward compatibility.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 illustrates a configuration example of a VUI according to an embodiment;

FIG. 4 illustrates an example of an OETF according to an embodiment;

FIG. 5 illustrates an example of extension for OETFs according to an embodiment;

FIG. 6 illustrates a configuration example of an SEI message according to an embodiment;

FIG. 7 illustrates a configuration example of an SEI message according to an embodiment;

FIG. 8 illustrates a configuration example of an SPS according to an embodiment;

FIG. 9 illustrates a configuration example of a hybrid descriptor according to an embodiment;

FIG. 10 illustrates a configuration example of a hybrid descriptor according to an embodiment;

FIG. 11 illustrates a configuration example of an HEVC descriptor according to an embodiment;

Figure 1:
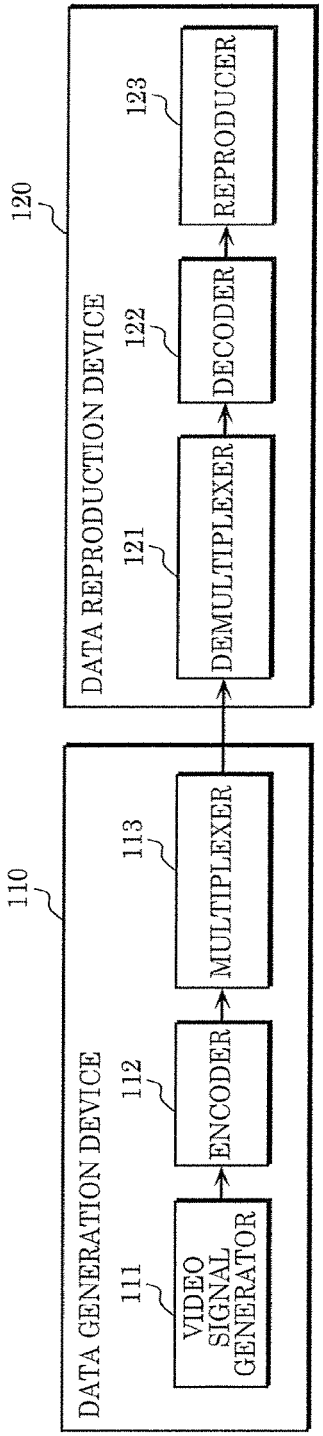
FIG. 1 illustrates a configuration of a system according to an embodiment.

DETAILED DESCRIPTION OF THE EMBODIMENT (Underlying Knowledge Forming Basis of the Present Disclosure)

The high dynamic range (HDR) has been gaining attention as a scheme covering a luminance range with an increased maximum luminance value in order to represent bright light such as mirror-reflected light, which cannot be represented using current TV signals, with brightness closer to its actual brightness while maintaining dark grayscale values of existing video. Specifically, the scheme covering the luminance range supported by the existing TV signals is called the standard dynamic range (SDR) and has the maximum luminance value of 100 nit, and the HDR is expected to have an increased maximum luminance value of at least 1,000 nit.

It is desired that video data covering such an HDR be reproducible even by an existing reproduction device that supports only the SDR. In other words, there is a demand for video data that is reproducible as HDR video by a reproduction device supporting the HDR and reproducible as SDR video by a reproduction device supporting the SDR.

The data generation method according to one aspect of the present disclosure is a data generation method for generating video data that covers a second luminance dynamic range wider than a first luminance dynamic range and has reproduction compatibility with a first device that does not support reproduction of video having the second luminance dynamic range and supports reproduction of video having the first luminance dynamic range, and the data generation method includes: generating a video signal to be included in the video data using a second opto-electrical transfer function (OETF) to be referred to by a second device when the second device decodes the video data, the second device supporting reproduction of video having the second luminance dynamic range; storing, into video usability information (VUI) in the video data, first transfer function information for identifying a first OETF to be referred to by the first device when the first device decodes the video data; and storing, into supplemental enhancement information (SEI) in the video data, second transfer function information for identifying the second OETF.

Accordingly, a device that only supports reproduction of video having the first luminance dynamic range can reproduce video data using the first transfer function information, and a device that supports reproduction of video having the second luminance dynamic range can reproduce video data using the second transfer function information. Thus, in the data generation method, video data having backward compatibility can be generated.

For example, the data generation method may further include storing, into a descriptor of a multiplexing layer, hybrid information indicating whether or not the video data is video data covering the second luminance dynamic range.

Accordingly, in the data reproduction device that reproduces video data, switching of reproduction schemes can be prepared in advance using the hybrid information in the multiplexing layer. This allows smooth switching of the reproduction schemes in the data reproduction device.

For example, the first OETF may be an OETF defined by a linear term of luminance of the video data in a first range of the luminance of the video data and defined by an exponential term of the luminance of the video data in a second range of the luminance of the video data which is greater than the first range.

For example, the second OETF may be an OETF defined by a linear term of luminance of the video data in a third range of the luminance of the video data, defined by an exponential term of the luminance of the video data in a fourth range of the luminance of the video data which is greater than the third range, and defined by a logarithmic term of the luminance of the video data in a fifth range of the luminance of the video data which is greater than the fourth range.

For example, the first OETF may be an OETF defined by an exponential term of luminance of the video data.

For example, the second OETF may be an OETF defined by an exponential term of luminance of the video data in a sixth range of the luminance of the video data and defined by a logarithmic term of the luminance of the video data in a seventh range of the luminance of the video data which is greater than the sixth range.

For example, the first OETF may be an OETF defined in one of BT. 709 and BT. 2020, and the second OETF may be a hybrid gamma OETF.

For example, the data generation method may further include storing, into the SEI, dynamic range increase information indicating a difference between a luminance dynamic range of the video data and the first luminance dynamic range.

For example, the data generation method may further include storing, into the SEI, maximum average picture level information indicating a highest average luminance value among average luminance values of all pictures included in a video sequence.

Furthermore, the data reproduction method according to one aspect of the present disclosure is a data reproduction method for reproducing video data that covers a second luminance dynamic range wider than a first luminance dynamic range and has reproduction compatibility with a first device that does not support reproduction of video having the second luminance dynamic range and supports reproduction of video having the first luminance dynamic range, the video data including: video usability information (VUI) storing first transfer function information for identifying a first opto-electrical transfer function (OETF) to be referred to by the first device when the first device decodes the video data; and supplemental enhancement information (SEI) storing second transfer function information for identifying a second OETF to be referred to by a second device when the second device decodes the video data, the second device supporting reproduction of video having the second luminance dynamic range, and the data reproduction method includes: obtaining the second transfer function information included in the SEI; and reproducing a video signal included in the video data by referring to the second OETF identified in the second transfer function information obtained.

Accordingly, in the data reproduction method, video data having backward compatibility can be reproduced.

For example, the video data may further include hybrid information indicating whether or not the video data is video data covering the second luminance dynamic range, the hybrid information being stored in a descriptor of a multiplexing layer, and the data reproduction method may further include: obtaining the hybrid information from the video data; preparing for switching between the reproduction of the video having the first luminance dynamic range and the reproduction of the video having the second luminance dynamic range, based on the hybrid information obtained; and switching the reproduction of the video having the first luminance dynamic range and the reproduction of the video having the second luminance dynamic range at a timing of a change in a video sequence.

Accordingly, switching of reproduction schemes can be prepared in advance using the hybrid information in the multiplexing layer. This allows smooth switching of the reproduction schemes.

For example, the first OETF may be an OETF defined by a linear term of luminance of the video data in a first range of the luminance of the video data and defined by an exponential term of the luminance of the video data in a second range of the luminance of the video data which is greater than the first range.

For example, the second OETF may be an OETF defined by a linear term of luminance of the video data in a third range of the luminance of the video data, defined by an exponential term of the luminance of the video data in a fourth range of the luminance of the video data which is greater than the third range, and defined by a logarithmic term of the luminance of the video data in a fifth range of the luminance of the video data which is greater than the fourth range.

For example, the first OETF may be an OETF defined by an exponential term of luminance of the video data.

For example, the second OETF may be an OETF defined by an exponential term of luminance of the video data in a sixth range of the luminance of the video data and defined by a logarithmic term of the luminance of the video data in a seventh range of the luminance of the video data which is greater than the sixth range.

For example, the first OETF may be an OETF defined in one of BT. 709 and BT. 2020, and the second OETF may be a hybrid gamma OETF.

For example, the data reproduction method may further include obtaining, from the SEI, dynamic range increase information indicating a difference between a luminance dynamic range of the video data and the first luminance dynamic range.

For example, the data reproduction method may further include obtaining, from the SEI, maximum average picture level information indicating a highest average luminance value among average luminance values of all pictures included in a video sequence.

The data generation device according to one aspect of the present disclosure is a data generation device which generates video data that covers a second luminance dynamic range wider than a first luminance dynamic range and has reproduction compatibility with a first device that does not support reproduction of video having the second luminance dynamic range and supports reproduction of video having the first luminance dynamic range, and the data generation device includes: a generator that generates a video signal to be included in the video data using a second opto-electrical transfer function (OETF) to be referred to by a second device when the second device decodes the video data, the second device supporting reproduction of video having the second luminance dynamic range; a first storage that stores, into video usability information (VIZ in the video data, first transfer function information for identifying a first OETF to be referred to by the first device when the first device decodes the video data; and a second storage that stores, into supplemental enhancement information (SEI) in the video data, second transfer function information for identifying the second OETF.

Accordingly, a device that only supports reproduction of video having the first luminance dynamic range can reproduce video data using the first transfer function information, and a device that supports reproduction of video having the second luminance dynamic range can reproduce video data using the second transfer function information. Thus, the data generation device can generate video data having backward compatibility.

The data reproduction device according to one aspect of the present disclosure is a data reproduction device which reproduces video data that covers a second luminance dynamic range wider than a first luminance dynamic range and has reproduction compatibility with a first device that does not support reproduction of video having the second luminance dynamic range and supports reproduction of video having the first luminance dynamic range, the video data including: video usability information (VUI) storing first transfer function information for identifying a first opto-electrical transfer function (OETF) to be referred to by the first device when the first device decodes the video data; and supplemental enhancement information (SEI) storing second transfer function information for identifying a second OETF to be referred to by a second device when the second device decodes the video data, the second device supporting reproduction of video having the second luminance dynamic range, and the data reproduction device includes: an obtainer that obtains the second transfer function information included in the SEI; and a reproducer that reproduces a video signal included in the video data by referring to the second OETF identified in the second transfer function information obtained.

Accordingly, the data reproduction device can reproduce video data having backward compatibility.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

Hereinafter, an embodiment will be specifically described with reference to the drawings.

Note that each embodiment described below shows a specific example of the present disclosure. The numerical values, shapes, materials, structural elements, the arrangement and connection of the structural elements, steps, the processing order of the steps etc. shown in the following embodiment are mere examples, and are not intended to limit the scope of the present disclosure. Furthermore, among the structural elements in the following embodiment, structural elements not recited in the independent claims indicating the broadest concepts of the present disclosure are described as arbitrary structural elements.

Although detailed descriptions of terms, data configuration, and processing, etc., may be omitted below, specific examples thereof are based on the descriptions in NPL 1, NPL2, and NPL 3, for example.

First, the configuration of a system according to the present embodiment will be described. FIG. 1 is a block diagram illustrating the configuration of the system according to the present embodiment. The system illustrated in FIG. 1 includes data generation device 110 and data reproduction device 120.

Data generation device 110 generates video data that covers a second luminance dynamic range (for example, the HDR) wider than a first luminance dynamic range (for example, the SDR) and has reproduction compatibility with a first device that does not support reproduction of video having the second luminance dynamic range and supports reproduction of video having the first luminance dynamic range.

Data generation device 110 include video signal generator 111, encoder 112, and multiplexer 113.

Figure 2:
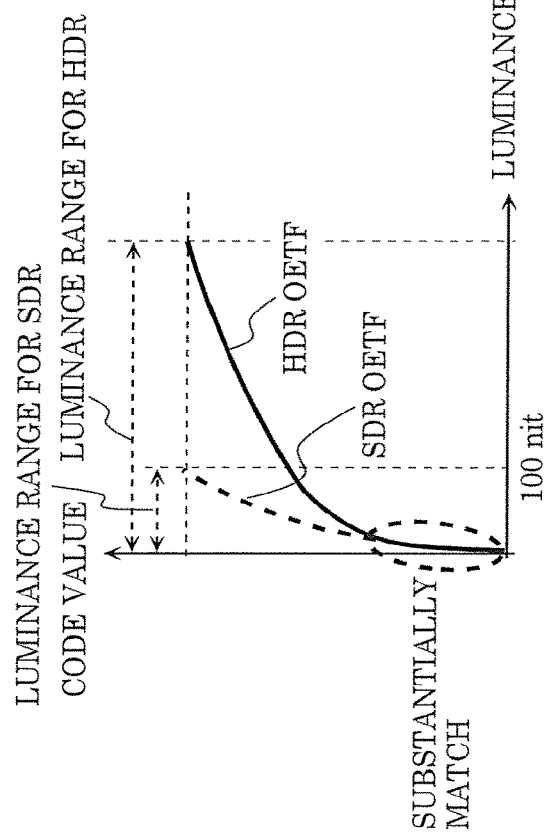
FIG. 2 illustrates one example of an OETF according to an embodiment.

Image signal generator 111 converts a luminance value of a source image covering the HDR into a code value using an opto-electrical transfer function (OETF). The OETF is a function for converting the luminance value of the source image into the code value, as illustrated in FIG. 2. Specifically, video signal generator 111 uses an SDR-compatible HDR OETF. This will be described in detail later. Note that "luminance" herein is not limited to the weighted sum of RGB components and may be the intensity of each of the RGB components, may be the degree of brightness of light, or may be the intensity of light.

Encoder 112 generates a video elementary stream by encoding the obtained code values according to a video coding standard such as the high efficiency video coding (HEVC). Multiplexer 113 generates a transport stream (for example, a DVB transport stream) by multiplexing video elementary streams.

The generated transport stream is transmitted to data reproduction device 120 by broadcast waves or the like, for example. Note that an example in which the broadcast waves are used will be described herein, but a network or the like may be used for transmission, or a recording medium such as a Blu-ray Disc (BD) may be used for transmission.

Data reproduction device 120 generates the video data generated by data generation device 110. Data reproduction device 120 includes demultiplexer 121, decoder 122, and reproducer 123.

Demultiplexer 121 generates a video elementary stream by demultiplexing the video data (the transport stream). Decoder 122 generates codes values by decoding the obtained video elementary stream according to a video coding standard such as the HEVC.

Reproducer 123 reconstructs video by converting the obtained code values into luminance values using an electro-optical transfer function (EOTF) corresponding to the OETF stated above. The EOTF is the inverse function which reverses the OETF and is used for converting the code values into the luminance values. The obtained video is displayed on a display, etc., included in data reproduction device 120 or connected to data reproduction device 120.

Signalling of the transfer function (OETF) according to the present embodiment will be described below.

The transfer function is signalled using transfer_characteristics within video usability information (VUI) included in a sequence parameter set (SPS) in the HEVC and AVC video coding standards.

The OETF alone is signalled, and the EOTF is not signalled.

FIG. 3 illustrates the syntax of a VUI parameter. As illustrated in FIG. 3, the VUI includes first transfer function information (transfer_characteristics). FIG. 4 is a table indicating the semantics of transfer_characteristics. Values 1 and 14 are assigned to SDR OETFs supported by digital video broadcasting (DVB) ultra HD (UHD) phase 1 receivers.

As described in NPL 1 and the like, transfer_characteristics indicates the opto-electrical voltage characteristics (the opto-electrical transfer characteristics) of the source image.

Note that signalling means including, in a transfer signal, a signal for identifying desired information or a signal indicating such information itself so that the receiver side can obtain the desired information. For example, in the example in FIG. 3 and FIG. 4, transfer_characteristics for identifying the OETF is included in the transfer signal, and the receiver side identifies the OETF on the basis of the received transfer_characteristics.

An example of extension for new OETFs according to the present embodiment will be described below.

The HEVC and AVC standards have reserved values for further extension. Thus, the reserved values can be assigned to SDR-compatible HDR OETFs (hereinafter referred to as hybrid OETFs). For example, as illustrated in FIG. 5, the hybrid OETFs are assigned to values 18 to 20 which are the reserved values.

In this case, however, a legacy data reproduction device (receiver) that does not support the HDR is not capable of recognizing the new values and recognizes them as the reserved values. Thus, there is the problem that when a new value is used for the hybrid OETF, it is not possible to provide the backward compatibility. The hybrid OETF is, for example, an OETF including a part expressed as a power of luminance and a part expressed as a logarithm of luminance, such as a BBC hybrid gamma OETF.

In the present embodiment, the value of the first transfer function information (transfer_characteristics) is set to 1 (BT.709) or 14 (BT.2020) as in an existing SDR.

Furthermore, in order to identify the hybrid OETF, the second transfer function information (HDR_transfer_characteristic) is signalled separately from the first transfer function information. Thus, in the data reproduction device that does not support the HDR, the OETF for SDR can be identified using the first transfer function information (transfer_characteristics), while, in the data reproduction device that supports the HDR, the OETF for HDR can be identified using the second transfer function information.

The second transfer function information (HDR_transfer_characteristic) is used for signalling of the OETF for HDR. Specifically, the OETF for HDR has compatibility with the OETF for SDR identified using the first transfer function information (transfer_characteristics).

For example, the second transfer function information (HDR_transfer_characteristic) indicates any of the three hybrid OETFs indicated in FIG. 5. Note that the second transfer function information may be information indicating whether or not to use the hybrid OETF. The number of selectable hybrid OETFs may be any number greater than or equal to one.

As illustrated in FIG. 2, the characteristics of the hybrid OETF substantially match the characteristics of the SDR OETF in a low luminance range. Specifically, in the low luminance range, the luminance of video reproduced using the hybrid OETF from the video signals generated using the hybrid OETF and the luminance of video reproduced using the SDR OETF from the video signals generated using the hybrid OETF are almost the same. Thus, it is possible to reduce the difference in luminance value between when the video is reproduced by an HDR device and when the video is reproduced by an SDR device, and therefore video that is less likely to provide a feeling of discomfort can be reproduced even when the video is reproduced using the SDR OETF.

Methods of storing the second transfer function information will be described below. The methods are roughly classified as a method in which the second transfer function information is stored into a video coding layer and a method in which the second transfer function information is stored into a multiplexing layer.

First, the method in which the second transfer function information is stored into the video coding layer will be described.

FIG. 6 illustrates the syntax of an HDR hybrid gamma SEI message (hereinafter referred to as a hybrid SEI message) according to the present embodiment. As illustrated in FIG. 6, the second transfer function information (HDR_transfer_characteristic) is included in the hybrid SEI message.

The hybrid SEI message is present only in an IRAP NAL unit or an I-picture and is valid for the remainder of a coded video sequence.

Note that the hybrid SEI message may be a prefix or a suffix SEI message.

The presence of this SEI message may be made mandatory in application standardization bodies when HDR_transfer_characteristic is a predetermined fixed value.

Furthermore, as illustrated in FIG. 7, the hybrid SEI message may include, in addition to the second transfer function information stated above or instead of the second transfer function information, dynamic range increase information (dynamic_range_increase) and maximum average picture level information (maximum_average_picture_level).

The dynamic range increase information (dynamic_range_increase) is used to calculate coefficient k and has value 0, 1, or 2 only. Coefficient k indicates a difference from dynamic range SDR and is determined according to the following Expression 1. Specifically, coefficient k indicates a scaling factor for the dynamic range of current video with respect to dynamic range SDR.

$$k=2\times dynamic\_range\_increase+4 \quad \text{(Expression 1)}$$

The maximum average picture level information (maximum_average_picture_level) indicates the highest average picture level among all the pictures included in a video sequence. The average picture level means the average value of pixel luminance expressed in percentage of the maximum luminance.

Thus, the use of the dynamic range increase information and the maximum average picture level information allows the difference from the SDR to be set within an arbitrary range.

The presence of this SEI message may be made mandatory in application standardization bodies when k is a predetermined fixed value. For example, k is equal to 4 for DVB, and k is equal to 8 for BDA.

FIG. 8 illustrates the configuration of an extended SPS. As illustrated in FIG. 8, the dynamic range increase information (dynamic_range_increase) and the maximum average picture level information (maximum_average_picture_level) may be included in the SPS.

Next, the method in which the second transfer function information is stored into the multiplexing layer will be described.

FIG. 9 illustrates the configuration of a hybrid descriptor (HDR_hybrid_gamma_descriptor) which is a new descriptor at the MPEG2-TS level according to the present embodiment.

As illustrated in FIG. 9, the hybrid descriptor includes a hybrid OETF flag (HDR_hybrid_gamma_OETF_flag) and the second transfer function information (HDR_transfer_characteristic).

The hybrid OETF flag (HDR_hybrid_gamma_OETF_flag) indicates whether or not the content is HDR coded using the hybrid OETF. For example, when the hybrid OETF flag is 1, the content is HDR coded using the hybrid OETF.

Note that the hybrid OETF flag is not always necessary, and it may be possible to use only the second transfer function information.

The hybrid descriptor is stored into at least one of a program map table (PMT) specified by the MPEG, a service description table (SDT) specified by the DVB in the DVB-SI standard, and an event information table (EIT) specified by the DVB in the DVB-SI standard.

The PMT indicates the PID of a TS packet in which an image, audio, or the like is stored. By obtaining the PID for a desired image, audio, or the like from the PMT, the data reproduction device can extract the TS packet for the desired image or audio.

The SDT indicates the name of a channel (a service), the type of the EIT sent through each channel, digital copy control information, and the like.

The EIT indicates information related to a program, such as the title, the broadcast date and time, and the broadcast content of the program.

When the hybrid descriptor is included in the PMT, the hybrid descriptor is applied to the video elementary stream only. In this case, however, a broadcaster needs to control modification of the PMT, and this modification may be difficult.

When the hybrid descriptor is included in the SDT, the content of the hybrid descriptor is not updated often. Thus, the SDT is preferred when the content of the hybrid descriptor is applied to the whole service.

When the hybrid descriptor is included in the EIT, it is advantageous that the content of the hybrid descriptor can be changed on an event basis.

FIG. 10 illustrates another configuration example of the hybrid descriptor according to the present embodiment. As illustrated in FIG. 10, the hybrid descriptor may include, in addition to the second transfer function information stated above or instead of the second transfer function information, dynamic range increase information (dynamic_range_increase) and maximum average picture level information (maximum_average_picture_level).

FIG. 11 illustrates the configuration of an HEVC descriptor (HEVC_descriptor) according to the present embodiment. The HEVC descriptor is a descriptor at the MPEG2-TS level. As illustrated in FIG. 11, the reserved values of the HEVC descriptor are replaced with a hybrid coded flag (hdr_hybrid_gamma_coded_content_flag) and dynamic range increase information (dynamic_range_increase). Note that the hybrid coded flag is the same as or similar to the hybrid OETF flag (HDR_hybrid_gamma_OETF_flag) described above. Furthermore, other information described above (the second transfer function information and the maximum average picture level information) may be included in the HEVC descriptor.

The same or like extension may be applied to an AVC descriptor (AVC_video_descriptor).

The hybrid descriptor (HDR_hybrid_gamma_descriptor) described above may be combined with signalling of the OETF to the video elementary stream (the HDR hybrid gamma SEI message). This allows smooth switching of parameters in the data reproduction device.

Figure 12:
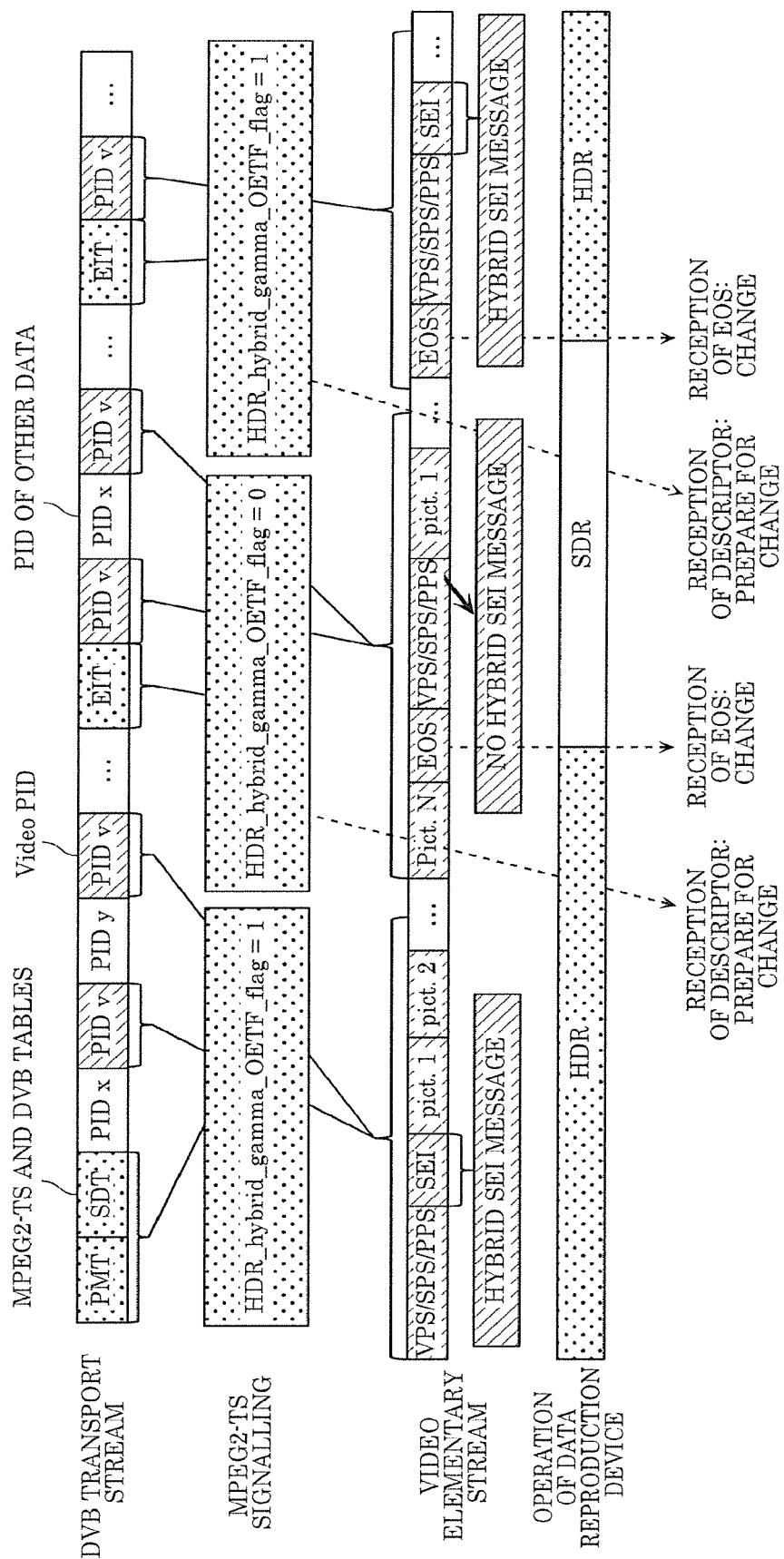
FIG. 12 illustrates a stream and an operation of a data reproduction device according to an embodiment.

Hereinafter, this operation will be described in detail. FIG. 12 illustrates the configuration of the stream and the operation of the data reproduction device.

Transmission of the hybrid descriptor (HDR_hybrid_gamma_descriptor) including the hybrid OETF flag (HDR_hybrid_gamma_OETF_flag) starts slightly before an actual change. The data reproduction device that received this hybrid OETF flag prepares for the change between the SDR and the HDR.

An end of sequence (EOS) indicating the end of a video sequence is inserted into the video elementary stream in order that the parameter change becomes active. The hybrid SEI message adapted to the last signalled hybrid descriptor may be or may not be stored at a random access point (RAP) following the EOS.

The data reproduction device detects whether or not the EOS and the hybrid SEI message are present and makes a change according to the detection result.

In the example illustrated in FIG. 12, the data reproduction device obtains the hybrid descriptor containing HDR_hybrid_gamma_OETF_flag=0 in the HDR operating state. This allows the data reproduction device to start preparing for switching operations from the HDR to the SDR. Next, the data reproduction device switches the HDR to the SDR at the timing when the EOS is obtained. The hybrid SEI message is not present within a SDR video elementary stream, and thus the data reproduction device does not obtain the hybrid SEI message.

Next, the data reproduction device obtains the hybrid descriptor containing HDR_hybrid_gamma_OETF_flag=1 in the SDR operating state. This allows the data reproduction device to start preparing for switching operations from the SDR to the HDR. Next, the data reproduction device switches the SDR to the HDR at the timing when the EOS is obtained.

Hereinafter, the operations of data generation device 110 and data reproduction device 120 based on the above description will be described.

Figure 13:
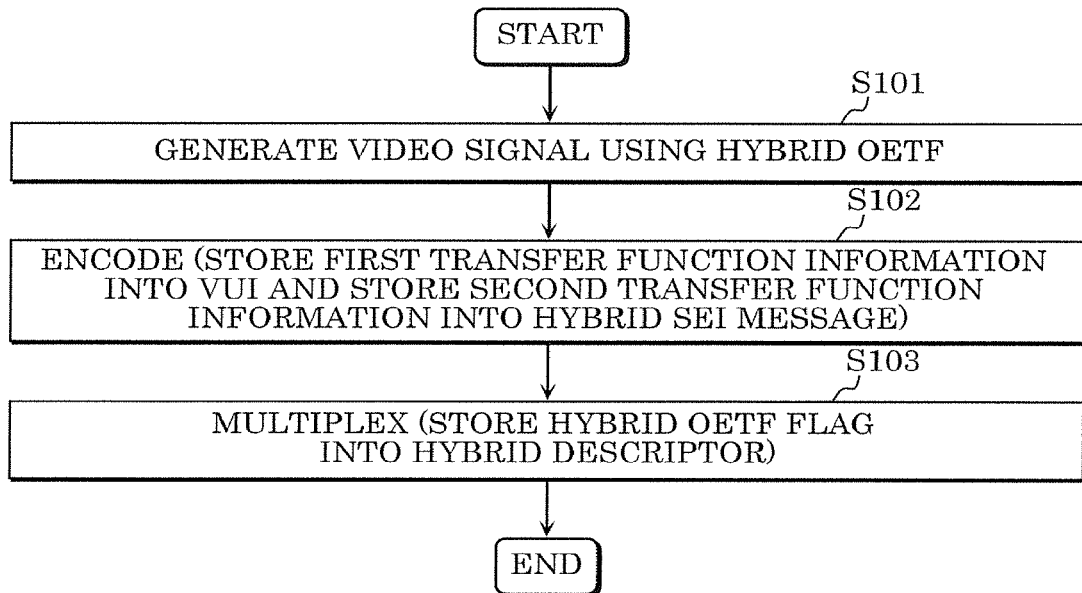
FIG. 13 is a flowchart illustrating an operation of a data generation device according to an embodiment.

FIG. 13 is a flowchart of an operation of data generation device 110 according to the present embodiment. Data generation device 110 generates HDR video data having reproduction compatibility with the first device that does not support reproduction of HDR video and supports reproduction of SDR video.

First, video signal generator 111 generates a video signal by converting a luminance value of a source image into a code value using the second OETF (S101). Next, encoder 112 generates a video elementary stream by encoding the video signal. At this time, encoder 112 stores, into the VUI in the video data (the video elementary stream), the first transfer function information for identifying the first OETF to be referred to by the first device supporting only the SDR when the first device reproduces the video data. Furthermore, the second transfer function information for identifying the second OETF to be referred to by the second device supporting the HDR when the second device decodes the video data is stored into the SEI in the video data (S102).

The VUI and the SEI belong to the video coding layer. The first OETF is, for example, the OETF defined in BT. 709 or BT. 2020, and the second OETF is, for example, a BBC hybrid gamma OETF.

Furthermore, encoder 112 may store, into the SEI, dynamic range increase information indicating a difference between the luminance dynamic range of the video data and luminance dynamic range SDR. Moreover, encoder 112 may store, into the SEI, maximum average picture level information indicating the highest average luminance value among the average luminance values of all the pictures included in the video sequence.

Next, multiplexer 113 generates a transport stream by multiplexing video elementary stream data. At this time, multiplexer 113 stores, into the hybrid descriptor of the multiplexing layer, hybrid information (a hybrid OETF flag) indicating whether or not the video data is HDR video data (S103).

Note that although the example in which the hybrid descriptor includes at least the hybrid OETF flag is illustrated in FIG. 12, the hybrid descriptor may further include the second transfer function information, the dynamic range increase information, or the maximum average picture level information.

Likewise, it is sufficient that the hybrid SEI message include at least one of the hybrid OETF flag, the second transfer function information, the dynamic range increase information, and the maximum average picture level information.

Furthermore, although each of the hybrid OETF flag and the second transfer function information is stated as individual information in the above description, the second transfer function information may be used instead of the hybrid OETF flag. This means that it is not necessary to use the hybrid OETF flag. For example, whether or not the video data is the HDR video data (whether or not to use the hybrid OETF) can be signalled according to whether or not the second transfer function information is included in the video data. Alternatively, whether or not the video data is the HDR video data may be signalled according to whether the second transfer function information indicates the hybrid OETF or the SDR OETF.

Note that the example in which the second transfer function information indicates the hybrid OETF is described above, but when HDR video and SDR video are mixed in video data, as illustrated in FIG. 12, the second transfer function information may indicate the SDR OETF for the SDR video as well. Accordingly, the data reproduction device supporting the HDR may always refer to the second transfer function information regardless of whether the video data has the SDR or the HDR. In other words, said data reproduction device does not need to refer to the first transfer function information. This allows the process of the data reproduction device to be simplified.

Figure 14:
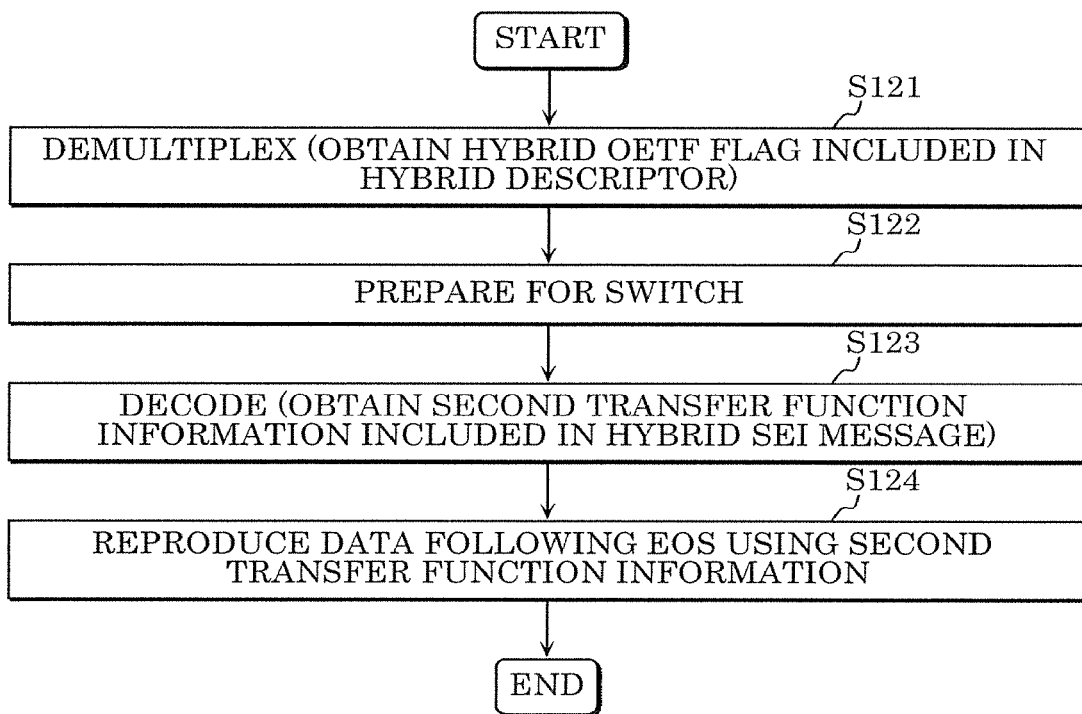
FIG. 14 is a flowchart illustrating an operation of a data reproduction device according to an embodiment.

FIG. 14 is a flowchart of an operation of data reproduction device 120 according to the present embodiment. Data reproduction device 120 reproduces HDR video data having reproduction compatibility with the first device that does not support reproduction of HDR video and supports reproduction of SDR video. This video data is the video data generated by data generation device 110, for example.

First, demultiplexer 121 generates a video elementary stream by demultiplexing the video data (the transport stream). At this time, demultiplexer 121 obtains hybrid information (for example, the hybrid OETF flag) from the hybrid descriptor of the video data (S121). Note that demultiplexer 121 may further obtain at least one of the dynamic range increase information and the maximum average picture level information from the hybrid descriptor.

Next, data reproduction device 120 prepares for switching between reproduction of SDR video and reproduction of HDR video on the basis of the obtained hybrid information (S122).

Next, decoder 122 generates a video signal (a code value) by decoding the video elementary stream. When the last hybrid OETF flag indicates the use of the hybrid OETF, decoder 122 obtains the second transfer function information included in the hybrid SEI within the video elementary stream (S123). Note that decoder 122 may further obtain at least one of the dynamic range increase information and the maximum average picture level information from the hybrid SEI.

Reproducer 123 reproduces a video signal included in the video data by referring to the second OETF identified in the obtained second transfer function information (S124). Furthermore, reproducer 123 switches reproduction of SDR video and reproduction of HDR video at the timing of a change in the video sequence. Specifically, reproducer 123 reproduces data following the EOS by the scheme after the change. When the dynamic range increase information or the maximum average picture level information is obtained, this information is used for the reproduction.

Note that when the last hybrid OETF flag indicates that the hybrid OETF has not been used, decoder 122 obtains the first transfer function information included in the VUI within the video elementary stream in Step S123. In Step S124, reproducer 123 reproduces a video signal included in the video data by referring to the second OETF identified in the obtained first transfer function information. Note that as described above, when the second transfer function information selectively indicates the first OETF or the second OETF, decoder 122 may always obtain the second transfer function information, and reproducer 123 may refer to the first OETF or the second OETF indicated in the second transfer function information.

As described above, in addition to the first transfer function information which is stored into the VUI, the second transfer function information is stored into the SEI message in the present embodiment. This makes it possible to implement HDR coding in which the hybrid OETF such as the BBC hybrid gamma OETF is used.

Specifically, whether the content is HDR coded using the hybrid OETF can be indicated through signalling to the multiplexing layer using a descriptor.

Furthermore, the combination of a new SEI message and a new descriptor allows the data reproduction device to smoothly switch between the HDR and the SDR.

The first OETF may be the function determined according to Expression 2 below.

[Math. 1]

$$V = \begin{cases} \alpha L & (0 \le L < \beta) \\ \gamma L^{\delta} - \rho & (\beta \le L \le 1) \end{cases} \quad \text{(Expression 2)}$$

In the expression, L is the luminance of an image and is standardized as $0 \le L \le 1$ at a reference white level, V is a numerical value corresponding to an electric signal, and $\alpha$, $\beta$, $\gamma$, $\delta$, and $\rho$ are each a constant and specific numerical examples thereof are $\alpha=4.5$, $\beta=0.018$, $\gamma=1.099$, $\delta=0.45$, and $\rho=0.099$.

In other words, as represented by Expression 2, the first OETF may be an OETF defined by a linear term of the luminance of video data in a first range of the luminance of the video data and defined by an exponential term of the luminance of the video data in a second range of the luminance of the video data greater than the first range.

Furthermore, the first OETF may be the function represented by Expression 3 below.

[Math. 2]

$$E' = \begin{cases} \alpha E & (0 \le E < \beta) \\ \gamma L^{\delta} - (\gamma-1) & (\beta \le E \le 1) \end{cases} \quad \text{(Expression 3)}$$

In this expression, L is the luminance of an image and defined as $0 \le L \le 1$, E is a numerical value corresponding to the voltage standardized at a reference white level and is proportional to the absolute light intensity detected in reference camera color channels RGB, resulting in E' being a non-linear signal, and $\alpha$, $\beta$, $\gamma$, $\delta$, and $\rho$ are each a constant and specific numerical examples thereof are $\alpha=4.5$, $\beta=0.018$ (for 10-bit system) or 0.0181 (for 12-bit system), $\gamma=1.099$ (for 10-bit system) or 1.0993 (for 12-bit system), $\delta=0.45$, and $\rho=0.099$.

Furthermore, the second OETF may be the function determined according to Expression 4 below, and in this OETF, a conversion function is defined by a logarithmic term in the range of high luminance.

[Math. 3]

$$V = \begin{cases} \alpha L & (0 \le L < \beta) \\ \gamma L^{\delta} - (\gamma-1) & (\beta \le L \le \mu) \\ \eta \ln(L) + \rho & (L > \mu) \end{cases} \quad \text{(Expression 4)}$$

In the expression, L is the luminance of an image and standardized at a reference white level, where V may exceed 1, meaning that this conversion function also supports luminance greater than the reference white, V is a numerical value corresponding to an electric signal, $\mu$ is a breakpoint between a gamma curve and a logarithmic curve and determines the maximum value of L where V is 1 or less, and $\alpha$, $\beta$, $\gamma$, $\delta$, and $\rho$ are each a constant and specific numerical examples thereof are $\alpha=4.5$, $\beta=0.018$, $\gamma=1.099$, $\delta=0.45$, and $\rho=0.099$.

In other words, as represented by Expression 4, the second OETF may be an OETF defined by a linear term of the luminance of video data in a third range of the luminance of the video data, defined by an exponential term of the luminance of the video data in a fourth range of the luminance of the video data greater than the third range, and defined by a logarithmic term of the luminance of the video data in a fifth range of the luminance of the video data greater than the fourth range.

The first OETF may be the function determined according to Expression 5 below.

[Math. 4]

$$V = L^{\alpha} \quad \text{(Expression 5)}$$

In this expression, L is the luminance of an image and standardized as $0 \le L \le 1$ at a reference white level, V is a numerical value corresponding to an electric signal, and a is a constant and a specific numerical example thereof is $\alpha=0.5$.

In other words, as represented by Expression 5, the first OETF may be an OETF defined by an exponential term of the luminance of the video data.

The second OETF may be the function determined according to Expression 6 below. In this OETF, a conversion function is defined by a logarithmic term in the range of high luminance.

[Math. 5]

$$V = \begin{cases} L^{\alpha} & (0 \le L \le \mu) \\ \eta \ln(L) + \rho & (L > \mu) \end{cases} \quad \text{(Expression 6)}$$

In this expression, α is a constant and a specific numerical example thereof is α=0.5.

In other words, as represented by Expression 6, the second OETF may be an OETF defined by an exponential term of the luminance of video data in a sixth range of the luminance of the video data and defined by a logarithmic term of the luminance of the video data in a seventh range of the luminance of the video data greater than the sixth range.

Although the data generation device (the data generation method) and the data reproduction device (the data reproduction method) according to one or more aspects are described thus far based on the embodiment, the present disclosure is not limited to this embodiment. Various modifications of the present embodiment as well as embodiments resulting from combinations of structural elements of the different embodiments that may be conceived by those skilled in the art may be included within the scope of one or more aspects as long as these do not depart from the essence of the present disclosure.

For example, in each embodiment described above, each of the structural elements may be configured in the form of an exclusive hardware product such as a circuit, or may be realized by executing a software program suitable for each of the structural elements. Each of the structural elements may be realized by means of a program executing unit, such as a central processing unit (CPU) and a processor, reading and executing the software program recorded on a recording medium such as a hard disk or a semiconductor memory.

INDUSTRIAL APPLICABILITY

The present disclosure can be applied to a data transmission device or a data reproduction device such as a BD device.

What is claimed is:

1. A decoding method, performed by a decoding device, comprising:
receiving video data generated according to a video coding standard and a second opto-electrical transfer function (OETF), an intensity of light within a second range being input into the second OETF, the video coding standard including at least an Advanced Video Coding standard and a High Efficiency Video Coding standard;
decoding the video data;
receiving video usability information (VUI) including a first value indicating a first OETF; and
receiving supplemental enhancement information (SEI) including a second value indicating the second OETF, wherein
the VUI and the SEI are supported by the video coding standard,
the first OETF supports a first range of an input intensity of light and the second range is wider than the first range,
the first value is to be referred to by the decoding device that does not support the second OETF,
the first range and the second range correspond to a first luminance range and a second luminance range, respectively, and
the second luminance range is wider than the first luminance range.

2. A non-transitory computer-readable medium storing a bitstream to be decoded by a decoding device, the bitstream comprising:
video data generated according to a video coding standard and a second opto-electrical transfer function (OETF), an intensity of light within a second range being input into the second OETF, the video coding standard including at least an Advanced Video Coding standard and a High Efficiency Video Coding standard;
video usability information (VUI) including a first value indicating a first OETF; and
supplemental enhancement information (SEI) including a second value indicating the second OETF, wherein
the VUI and the SEI are supported by the video coding standard,
the first OETF supports a first range of an input intensity of light and the second range is wider than the first range,
the first value is to be referred to by the decoding device that does not support the second OETF,
the first range and the second range correspond to a first luminance range and a second luminance range, respectively, and
the second luminance range is wider than the first luminance range.

3. An encoding method, performed by an encoding device, comprising:
encoding video data according to a video coding standard and a second opto-electrical transfer function (OETF), an intensity of light within a second range being input into the second OETF, the video coding standard including at least an Advanced Video Coding standard and a High Efficiency Video Coding standard;
storing video usability information (VUI) including a first value indicating a first OETF; and
storing supplemental enhancement information (SEI) including a second value indicating the second OETF, wherein
the VUI and the SEI are supported by the video coding standard,
the first OETF supports a first range of an input intensity of light and the second range is wider than the first range,
the first value is to be referred to by a decoding device that does not support the second OETF,
the first range and the second range correspond to a first luminance range and a second luminance range, respectively, and
the second luminance range is wider than the first luminance range.

* * * * *